Aug. 17, 1954

D. J. HINMAN

2,686,554

MOLDING METHOD

Filed June 21, 1951

INVENTOR.
DORR J. HINMAN
BY James J. Long
AGENT

INVENTOR.
DORR J. HINMAN
BY James J. Long
AGENT

INVENTOR.
DORR J. HINMAN
BY James J. Long
AGENT

Aug. 17, 1954     D. J. HINMAN     2,686,554
MOLDING METHOD Filed June 21, 1951     4 Sheets-Sheet 4

INVENTOR.
DORR J. HINMAN
BY James J. Long
AGENT

Patented Aug. 17, 1954

2,686,554

UNITED STATES PATENT OFFICE 2,686,554

MOLDING METHOD

Dorr J. Hinman, Detroit, Mich., assignor to United States Rubber Company, New York, N. Y., a corporation of New Jersey Application June 21, 1951, Serial No. 232,683

9 Claims. (Cl. 154—14)

This invention relates to an improved method for shaping rubber and similar materials having a high elastic memory, and more particularly the invention relates to an improved molding method involving the step of producing stresses in the molded material to counteract distorting stresses normally present therein.

One object of the invention is to provide a method for molding rubber and the like which can be carried out more rapidly and more economically than previous molding methods.

Another object is the provision of a method for counteracting undesirable strains which are normally imparted to rubber and similar materials having high elastic memory when they are molded.

Still another object is to provide an improved method of making pneumatic tires by compression molding.

Still a further object of the invention is a provision of a method of forming tire treads which insures that the tread will be uniform around the circumference of the tire, thereby eliminating the "thump," unbalance, and undesirable riding characteristics sometimes encountered in pneumatic tires in which the tread portion has been formed by conventional methods.

The manner in which the invention accomplishes the foregoing objects, and additional objects and advantages, will be made evident in the following detailed description of the invention, which is intended to be read with reference to the accompanying drawings, wherein.

In its more general aspect, the invention provides an improved method of impressing a desired shape, as by molding, upon materials having substantial elastic memory, that is, materials which are particularly rubbery so that they have a marked tendency to resist the shaping forces imposed upon them and tend to "recover" or return to some former shape which they had prior to the shaping operation. Such behavior is characteristic not only of raw natural rubber itself, but is exhibited also by the typical synthetic rubbers, notably those derived by polymerization of conjugated dienes, e. g., Buna-S, the rubbery copolymer of styrene and butadiene-1,3; polychloroprene, etc. As a result of this phenomenon of elastic memory, it is observed that when rubbery materials are shaped in the unvulcanized state, as by molding, the unvulcanized molded object tends to shrink when the mold is opened. Such shrinkage is a consequence of the presence within the rubber of internal stresses which act to return the rubber to its original shape when the molding force is relieved. The previous practice in molding unvulcanized rubber has been to prevent the shrinkage stresses within the rubber from acting by cooling the molded rubber before opening the mold, thereby "freezing" the shrinkage stresses, that is, thereby preventing the shrinkage stresses from acting because of the relative rigidity induced in the molded rubber by cooling it to temperatures substantially below the molding temperature. After such a cooling step, the mold may be opened without fear of shrinkage and distortion of the molded form. The fact that cooling of the rubber in the mold results in such freezing of the shrinkage stresses is confirmed by the interesting observation that if the molded object so produced is heated to an elevated temperature at a later time, shrinkage and distortion of the object will take place, due to release of the frozen stresses. It will be understood that this phenomenon is peculiar to rubber in the raw or unvulcanized state only; if the rubber is vulcanized such "elastic memory" forces no longer exist.

The necessity for cooling the mold before opening it in order to avoid shrinkage and distortion gives rise to delay in manufacturing operations, particularly in the case of such articles as heavy service pneumatic tires, wherein the molds are necessarily of great size and may require considerable time for cooling. Such delay significantly reduces the amount of production which can be obtained from a given piece of molding equipment. Furthermore, the cooling operation represents a substantial wastage of heat, since the mold must be heated up again preparatory to a subsequent molding operation. The present invention makes the cooling procedure unnecessary, and is based on the discovery that shrinkage of the shaped form can be prevented by producing within the molded material additional stresses which counteract the shrinkage stresses.

In practicing the invention with annular objects such as pneumatic tires, curing bags, and inner tubes, it is found that the shrinkage stresses, which are generally radial in direction, can be counteracted by producing circumferential stresses.

In the preferred form of the invention, the desired shrinkage-neutralizing stresses are produced in such annular objects as molded tire treads by exerting a circumferential shearing action on the rubbery material in the mold. Typically such shearing action is produced by rotating the core wall in contact with the inner surface of the tread relative to the mold wall in contact with the outer surface of the tread, it being understood that there will be sufficient frictional resistance between the surfaces of the tread and the core and mold walls so that such relative rotation produces rotary or circumferential shearing of the rubber mass. The rotary shearing stresses thus produced prevent the normal molding stresses from causing shrinkage, so that the mold can be opened without cooling.

Figure 1:
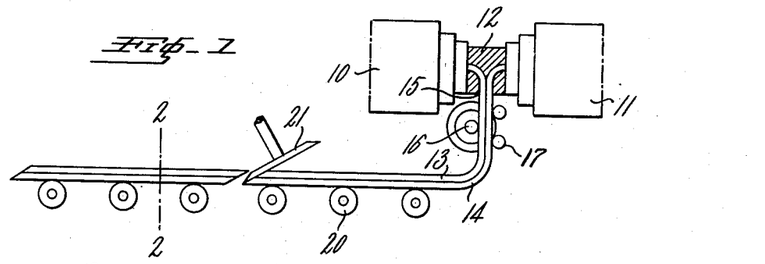
Fig. 1 is a largely schematic side elevational view of an apparatus for preforming the rubber tire tread in accordance with one method of carrying out the invention.
Figure 2:
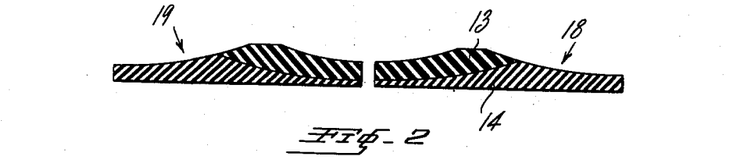
Fig. 2 is a transverse sectional elevational view, taken along the line 2—2 of Fig. 1, of a preformed tire tread split longitudinally into two equal sections.

In the accompanying drawings, an embodiment of the invention is illustrated in conjunction with a method of preforming pneumatic tires disclosed and claimed in a copending application of H. Weigold and D. J. Hinman, Serial No. 232,682, filed June 21, 1951, and assigned to the same assignee as the instant application. Such preform molding method involves providing an approximate preform of a tire tread from a plurality of rubber stocks located in positions corresponding essentially to the desired location of the stocks in the final tire tread, and compression molding such preforms in a smooth surfaced mold, after which they are united to a tire carcass, and then vulcanized in the usual tire mold. Referring to the drawings, Fig. 1 shows an arrangement of two opposed heated extruding devices 10 and 11 which are adapted to deliver through a common die head 12 two different streams of rubber stock, the one stream 13 being composed of abrasion resistant tread stock, and the other stream 14 being composed of crack resistant sidewall stock. The exit orifice 15 of the die 12 has the approximate cross sectional shape of a tire tread assembly, and the streams 13 and 14 are united firmly together as they stream through the die orifice. After emerging from the die the tread may be split longitudinally along its center line by rotating cutting knife 16 as the tread advances in engagement with back-up rollers 17, or may be split by any other practical means to produce two equal tread halves 18 and 19, as indicated most clearly in Fig. 2. The split tread advances onto the rollers 20 of a conveyor, and may be cut transversely at intervals by a rotating knife 21 into sections approximating in length the circumference of the desired tire tread and containing the proper weight or quantity of rubber required to form the tread. Opposite ends of such lengths are then spliced together, as by cementing, to form annular bands or preforms, each representing a transaxial half of the tire tread. In practice these bands or preforms are usually made slightly undersized and are stretched when applied to the core member so that they cling to and substantially conform to the surfaces of the core members.

The preforms are then molded in a mold comprising, as shown in Figs. 3 to 6, upper and lower annular mold halves or shells 24 and 25, each having on its inner face an annular recess 26, 27 corresponding in outline to the external contour of the tire tread except that the mold surfaces are of essentially smooth contour, that is, no provision is made in the mold surface for forming an anti-skid tread design on the tire surface. A cooperating annular core piece 28 is adapted to be disposed between the upper and lower mold halves and is provided with upper and lower protruding faces 29, 30 having the approximate contour of a tire carcass. An external horizontal flange member 31 extends outwardly radially at the central plane of the core and is provided with peripheral gear teeth 32 whereby the core may be rotated in a manner to be described.

For bringing the mold halves or shells 24, 25 together against the core 28, the mold halves are mounted in a suitable press, comprising a lower movable platen 35 on the upper surface of which the lower mold half 25 is mounted, and an upper fixed platen 36 on the under surface of which the upper mold half 24 is fixed. The lower platen 35 is adapted to be raised or lowered by the usual double acting hydraulic cylinder 37 contained within the base 38 of the press, from which a piston 39 carrying the platen 35 extends upwardly. Tie rods 40 extend upwardly from the base of the machine and pass slidably through the lower platen 35 to support the upper platen 36.

Figure 3:
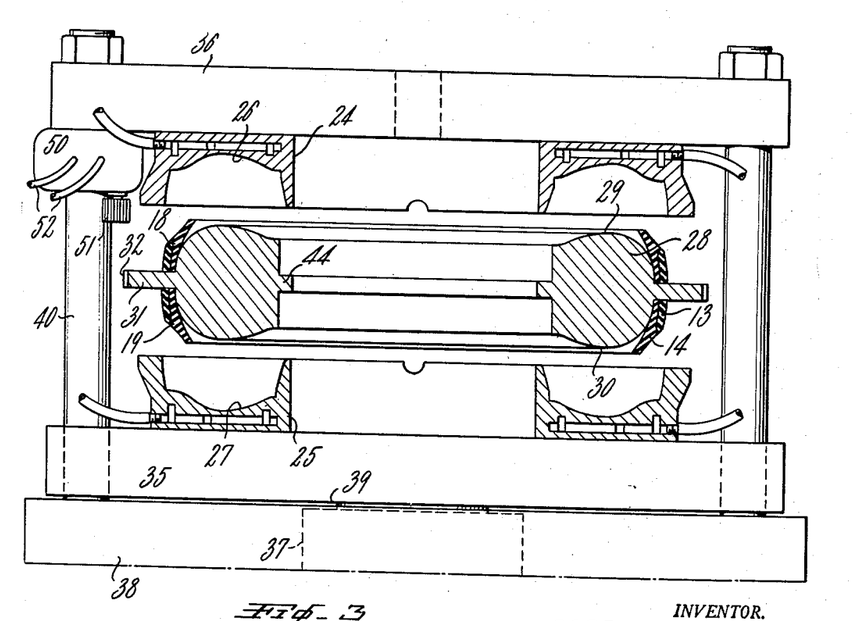
Fig. 3 is a partial elevational view of a molding press in the open position, with parts shown in section, for molding the preform.
Figure 4:
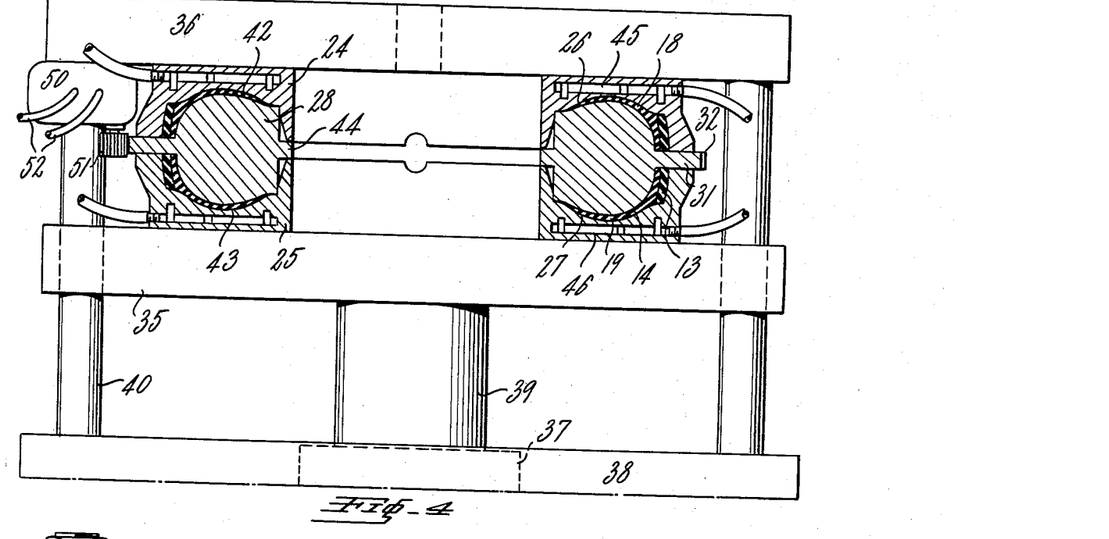
Fig. 4 is a similar view of the molding press of Fig. 3 in the closed position.

One of the preforms 18, 19 is stretched over each of the core surfaces 29, 30 as indicated in Fig. 3 and the mold halves are then brought together against the core piece to enclose the preforms, as indicated in Fig. 4, in mold cavities 42, 43 each having the shape of a transaxial half of the tire tread. In the closed position, the upper and lower surfaces of the external core flange 31 are engaged by opposing edges of the mold, while the inner edges of the mold engage a small internal flange 44 on the core 28.

The preforms 18 and 19 are preferably at a suitable elevated temperature, e. g., 200° F., when they are placed on the core piece 28. Ordinarily, the preforms will retain sufficient heat from the previous extrusion operation to be at this temperature but, if not, they may be heated by some external means such as steam or hot air. It is also preferable that the core piece be preheated to an elevated temperature, e. g., 250° F. The mold halves 24, 25 are also preheated to an elevated temperature, e. g., 250° F., as by circulating a heated fluid medium from an external source (not shown) through internal passages 45, 46 in the body of the mold halves. Under the influence of heat and pressure the rubber stock flows into uniform shape in conformity with the walls of the cavities 42, 43. However, the relative positions of the tread stock proper 13, and the sidewall stock 14 are not disturbed during during this molding operation. It will be understood that during the preforming operation the rubber is not subjected to sufficient heating to cause vulcanization, otherwise the preform could not be properly shaped during the final molding in the vulcanizing mold.

Ordinarily, this compression molding operation induces in the rubber stock constituting the preforms 18, 19 definite stresses which are opposite in direction to the strains imposed on the stock in the course of the molding. As a result of the elastic memory of the stock these stresses tend to persist and will cause the molded form to retract and pull away from the surfaces 26 and 27 of the mold cavity when the mold is opened. To prevent this there is provided a means for rotating the core member 28, comprising a motor 50 mounted on the lower surface of the upper platen 36 in such position that a pinion gear 51 on the end of a shaft extending downwardly from the motor engages the peripheral gear teeth 32 of the core piece 28 when the press is closed as indicated in Fig. 4. The motor 50 is a commercially available hydraulic motor and is capable of being rotated in either direction, as desired, at controlled speeds. It is connected to the usual source (not shown) of hydraulic fluid by means of fluid supply lines 52. In order to counteract the shrinkage stresses set up in the rubber stock by the molding operation, the core 28 is rotated with respect to the outer mold shells 24, 25, producing rotary shearing of the rubber stock. The degree of rotation of the core 28 is preferably sufficient to produce rotary shearing plastic deformation substantially in excess of the shearing elastic deformation of the rubber stock, that is to say, the stock is subjected to shearing strain beyond the strain that would be recovered elastically if the stock were released.

It has been found that the most satisfactory results are obtained when the mold core is rotated to produce initially a relatively high degree of shear, and thereafter reversely rotated somewhat, leaving a net shear of a slightly lesser value than that attained in the initial rotation. The shear produced on reverse rotation is typically of the order of about 5 to 15% of that produced in the initial forward rotation. In most cases, with the usual rubber stocks, it is found preferable to apply initially sufficient rotation to produce about 800–1200% shear, i. e., a rotation, measured along the circumference of the tread, of 3–12 times the thickness of the tread, measured at the mold parting line, and to thereafter rotate the core in a reverse direction to the extent of about 50–150% shear. The angular rotation required to produce such shear will of course depend on the ratio of the thickness of the tread at the parting line of the mold to the circumference of the tread. With the mold illustrated, a forward rotation of 20°, equivalent to 1000% shear, followed by a backward rotation of 2°, equivalent to 100% shear, was employed with satisfactory results.

It has further been found that the rotation is much more effective in counteracting retraction when the speed of rotation is relatively rapid, e. g., 1000% shear within one second, consistent with the requirement that the rotating core should not slip appreciably with respect to the rubber stock, but must actually produce shear in the rubber by frictional engagement therewith, and consistent with the available power that it is practical to apply to the core.

Upon completion of the forward rotation of the core, and prior to the reverse rotation, there should be allowed a rest period during which the core remains stationary, that is, the core should be held in its initially rotated position for a brief period of time, during which a factor which is called "stress decay" sets in. The phenomenon of stress decay, peculiar to materials having elastic memory such as raw rubber stock, may be illustrated by applying to a strip of rubber of definite cross section a load sufficient to produce a definite elongation. It will be observed that a certain initial load is required to produce this elongation, and in order to maintain the elongation at this constant value the load must be continually decreased with passage of time. For example, a load sufficient to produce 10% stretch was applied to a strip of typical raw rubber stock one square centimeter in cross section. After thirty seconds the load required to maintain this stretch was 400 grams. After ten minutes it was only half that value, and at four hours the load was only 70 grams. For purposes of the present invention it is sufficient to allow a rest period after the initial rotation sufficient for substantial stress decay to take place. The elevated temperature of the rubber in the preforming mold makes the time required for stress decay relatively short, and with the usual rubber stocks it is found that a rest period of from 5 to 15 seconds is ordinarily sufficient, whereupon the reversed rotation may then be applied. It is preferred to allow also a brief period of time in the reversely rotated position, say 5 to 15 seconds, before opening the mold.

The step of rotating the mold core with respect to the mold shell makes it possible to carry out the foregoing preforming method more rapidly and economically than has heretofore been possible since it eliminates the necessity for a cooling step before opening the mold after compressing the preforms as shown in Fig. 4.

In order that the preformed tread will adhere to the mold halves as the mold is opened, the core is surfaced in such manner that its adhesion to the rubber stock is relatively small. For this purpose it has been found preferable to chrome plate and polish the surface of the core. While the adhesion of the core to the rubber must be relatively small, it should not be so small that there is substantially no frictional engagement between the core and the rubber, otherwise the desired shearing of the rubber stock is not obtained as the core is rotated. In some instances, it may be found desirable to provide slight ridges on the surface of the core to prevent slippage of the stock as the core is rotated.

Figure 5:
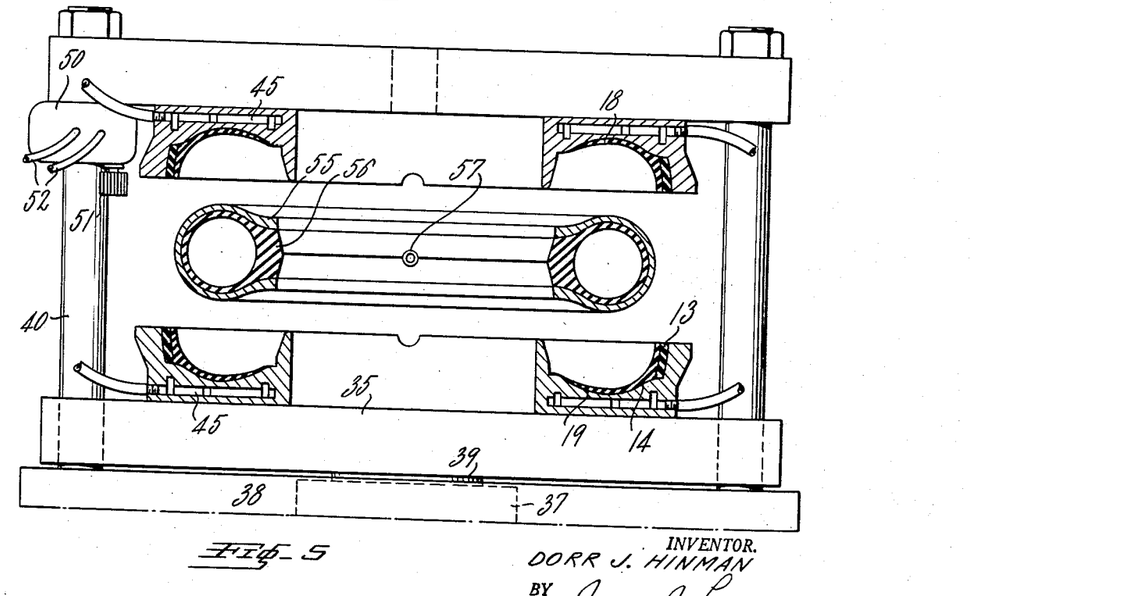
Fig. 5 is a similar view of the molding press in the open position with a tire carcass containing a curing bag in process of being inserted in the mold.

After the mold is opened as indicated in Fig. 5, leaving the formed unvulcanized tread segments in the mold, the core 28 is removed. There is then inserted in the mold a shaped tire carcass 55, containing a curing bag 56, as indicated in Fig. 5. The tire carcass 55 may be built up previously in the form of an annular band on a collapsible tire building drum by superimposing a plurality of plies of rubber tire fabric and incorporating the usual inextensible bead elements in the marginal edges of the band. The band is then shaped into annular toroidal form in a vacuum shaping box and the curing bag 56 is inserted therein. The curing bag 56 is made of extensible, heat resistant material, such as butyl rubber, and is formed with relatively thick walls having an external contour corresponding to the internal shape of the tire carcass and is provided with an inlet opening 57 in the rim portion thereof.

Figure 6:
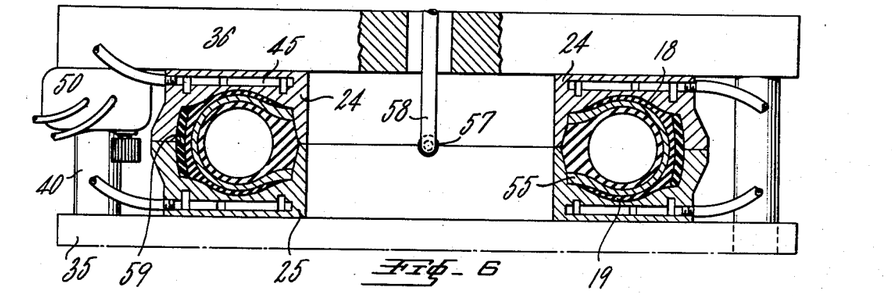
Fig. 6 is a similar fragmentary view showing the molding press in the closed position for uniting the formed tread to the tire carcass.

The mold halves 24, 25 are closed over the assembly of curing bag and carcass, as indicated in Fig. 6, and the bag 56 is inflated through the inlet opening 57 by means of an air hose 58 connected thereto, causing the carcass to expand into contact with and to adhere to the tread segments. The temperature of the tread segments of this stage of the operation will generally be about 250° F., and the temperature of the carcass is usually about 200° F. The elevated temperature of the carcass permits the carcass cords to readjust themselves as the carcass is expanded against the tread segments. Usually the pressure applied within the curing bag at this stage will be within the range from 60 to 250 p. s. i. Satisfactory results have been obtained by maintaining a pressure of about 90 p. s. i. for a period of from 15 seconds to 3 minutes. This operation also causes the two transaxial halves or segments of the tread to be spliced together along a circumferential line 59 (Fig. 6) corresponding to the parting line of the mold. To avoid entrapping air between the carcass and the tread, it has been found preferable to first bring the mold to within ⅛ inch of being completely closed, and then inflate the bag to drive out the air from between the carcass and the tread, and thereafter close the mold completely. It is also preferable that the contour of the inner surface of the tread be such that the carcass, when it is expanded by the action of the curing bag, contacts the tread first at the bead area, and then at the sidewall, and thereafter progressively up to the center of the crown, to thereby expel all the air from between the mold halves. Such a contour is obtainable on the interior surface of the tread by suitably shaping the surface of the core piece 28, which determines the contour of the inner tread surface.

The mold is thereafter opened, and because of the greater adhesion of the tread to the carcass than to the mold halves, the tread separates from the mold and remains on the carcass. It has been found that satisfactory results are obtained by employing an unpolished chromium plating on the mold surfaces, that is, a generally matte surfaced chromium. In preparing the mold surfaces they are first vapor blasted and then chrome plated and the surface is left unpolished. The surface thus produced has less adhesion for the rubber than the tire carcass, but at the same time this surface has greater adhesion to the rubber than the polished chrome plating on the core piece 28, so that the tread remains in the mold halves as shown in Fig. 5, rather than on the core when the mold is opened after the preforming operation as indicated in Fig. 4. If desired, the mold surfaces, in place of being unpolished chromium, may be nickel plated, but the nickel plated surface has the disadvantage that it requires occasional polishing to remove oxidized surfaces which causes the rubber to stick to it.

Figure 7:
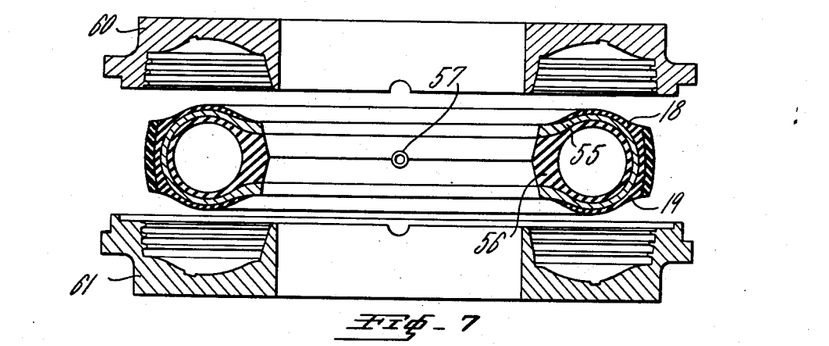
Fig. 7 is a transverse sectional elevational view showing the united tread and carcass being inserted in a final shaping and curing mold.
Figure 8:
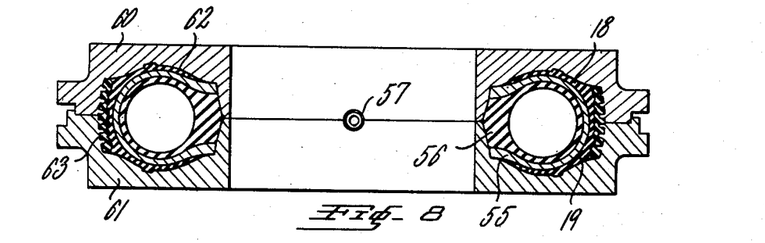
Fig. 8 is a transverse sectional elevational view of the shaping and curing mold with the tire in place for final shaping and vulcanization.
Figure 9:
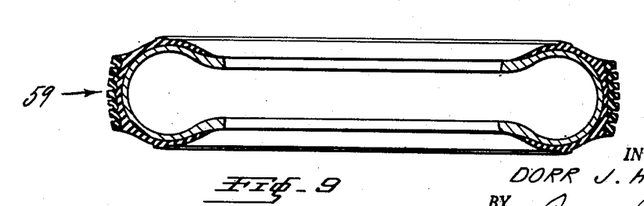
Fig. 9 is a transverse sectional elevational view of the completed tire.

The assembly of tread, carcass and curing bag is now ready for the vulcanizing operation, and for this purpose the assembly may then be placed, as indicated in Figs. 7 and 8, in a conventional tire curing mold of the pot heater type composed of upper and lower mold halves 60, 61 which define a tire shaped mold cavity 62 having a design 63 in its surface forming an anti-skid pattern in the tire tread. With pot heater type equipment the tire mold 60, 61 is placed in a vulcanizing press (not shown) wherein it is subjected to heat and pressure sufficient to vulcanize the tire tread and carcass. It will be understood that at the same time heat and pressure are applied to the interior of the curing bag through the opening 57. The mold cavity defined between the preforming mold halves 24, 25 is somewhat smaller than the final vulcanizing cavity 62, so that the carcass and tire tread expand somewhat further in the final mold, under the influence of internal pressure in the curing bag. The tread and carcass assembly as shown in Fig. 7 may, if desired, be cured or vulcanized in a conventional unit vulcanizer of the McNeill or De Mattia type. The finished tire 59 after removal from the mold is shown in Fig. 9.

The molding of the tire tread as a preformed shape in the foregoing manner results in a uniform, balanced tread. Because there is no transverse splice in the tread, as is the case in tires made in the conventional manner, a primary cause of the irregularity of the tire is removed and tires of superior quality result.

The step of rotating the mold members relative to each other to counteract shrinkage stresses and make the mold cooling step unnecessary results in an appreciable saving of time in the manufacture of tires by the foregoing method. Under typical factory operating conditions, the mold cooling step may require about 3 or 4 minutes, while the present mold rotating method requires no more than about 30 seconds. The mold rotating method described may be applied with equal benefit to the tire compression molding method described in U. S. Patent 2,497,226, of McNeill, issued February 14, 1950. To apply the present method to the molding process disclosed in this patent it is necessary merely to fix one or the other of the mold members and to rotate the other mold member as described above. The mold rotating step may also be applied to advantage in the tire molding method described in copending application of D. J. Hinman, Serial No. 232,681, filed of even date herewith, now Patent No. 2,649,891, in which a tire tread is preformed in the form of a cylindrical band.

The relative rotation of the mold members to produce in the molded rubber a strain pattern which counteracts the strains which are normally set up during the compression molding has further advantages in that it is found that the rotation makes it possible to accomplish molding of the preform without using such great pressures as have heretofore been considered necessary for this purpose. For example, it has formerly been considered necessary to us molding pressures of the order of 2,000 p. s. i. of projected area when molding the raw preforms as illustrated in Fig. 4, but it has been found that when the core is rotated with relation to the mold as described, pressures as low as 300 p. s. i. are quite satisfactory, and in fact, are preferred because less torque is required to rotate the core than when the high forming pressures were used. This ability to use considerably reduced forming pressures, while still obtaining a properly formed tire tread, is of particularly great importance in the case of large heavy service tires, where the molding presses necessary to develop high forming pressures are so much more expensive and complicated in construction than presses designed to operate at lower pressures.

A further advantage of eliminating the usual cooling step by rotating the core is that when the assembly of tire tread and carcass is placed in the final vulcanizing mold, as indicated in Figs. 7 and 8, it has a higher temperature than it would have if the preforming mold had to be cooled before it could be opened. This increased temperature of the tire as it is placed in the vulcanizing mold makes it possible to realize a saving of the order of 15% on the time of cure. This is possible because the tread is formed at temperatures well above 200° F., and, when retraction stresses are controlled by shear treatment, cure can start immediately when the tire is placed in the curing mold, thus saving time normally required to heat the tread stock up to that temperature.

The rotary shearing step not only eliminates the effect of residual shrinkage stresses arising in the preformed molding step itself, but also counteracts any distortion stresses present in the preforms 18, 19 before they are placed in the mold. Such distortion stresses may arise, for example, during the extrusion operation depicted in Fig. 1, which frequently produces localized areas of stress along the length of the preform due to a surging action in the extruder, and such stresses may also arise as a result of the operation of splicing the preform into the form of an annular band for placing on the surfaces 29 and 30 of the mold core 28 as depicted in Fig. 3. While these stresses may be of small magnitude compared to the stresses arising in the compression molding itself, their presence is deleterious to the extent that they ordinarily give rise to a degree of irregularity in the finished tire, and by eliminating this, as in the present process, tires of improved quality are obtained. Thus, ordinarily circumferential irregularities in the stock due to non-uniform extrusion and splicing of the preform frequently cause circumferential stresses to be imposed on the stock during the molding operation. This can result in unbalance and "thump" in the finished tire. Such irregularities are substantially removed by the present method.

The origin of the retraction stresses in the molding operation will be evident from a consideration of the fact that as the mold closes (Fig. 3) on the preforms 18, 19 the stock flows to a new shape (Fig. 4). This movement of the rubber stock sets up the major stresses which ordinarily cause shrinkage or retraction when the core and mold are separated as in opening the press (Fig. 5). Most of these stresses lie in trans-axial planes in the stock and when the forming pressure is released they would ordinarily tend to pull the stock back into its original shape.

Figure 10:
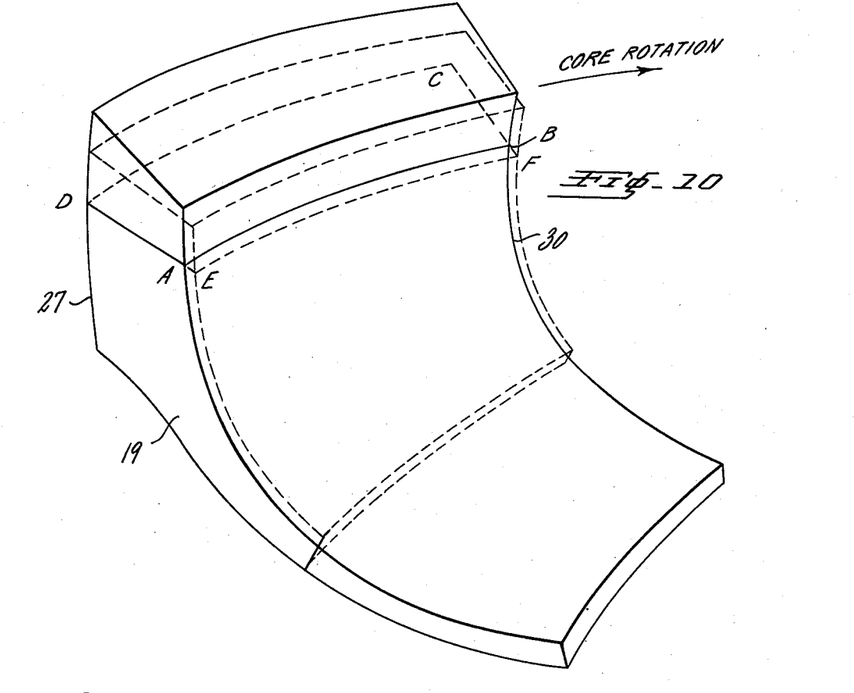
Fig. 10 is a diagrammatic perspective view of a portion of a molded prefrom showing the stresses imparted thereto during the process of the invention.
Figure 11:
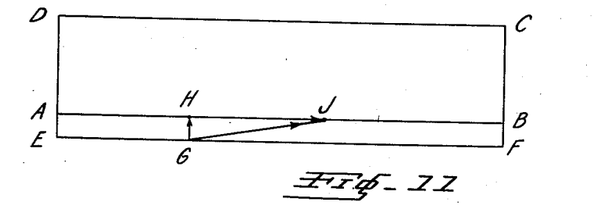
Figs. 11 and 12 are vector diagrams of stresses occurring during the process.
Figure 12:
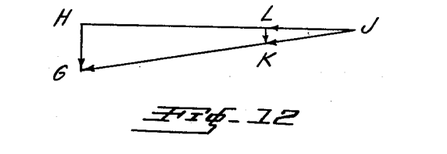

This movement of the stock during the preform molding is represented in Fig. 10, where the broken lines show the original shape of the preform 19 and the solid lines show the final shape when the mold is closed. Any plane perpendicular to the core surface cut thru this section of the preform after the molding operation could be illustrated by the rectangle ABCD. Neglecting the curve of the mold and core for purposes of simplicity, the rectangle ABCD appears in the flat as shown in Fig. 11. Broken line EF represents the position of line AB in the original shape of the preform. Vector GH (Fig. 11) represents the movement of a point G on line EF during the molding operation. In Fig. 12, vector HG represents the resulting stress in the opposite direction which tends to return the preform to its original shape. This is the residual stress which normally would cause the stock to pull away from the mold.

The mold surface 27 being fixed, and the core surface 30 being rotated as indicated by the arrow in Fig. 10, the point G now moves along path HJ. The resultant movement of the point G is represented by the arrow GJ in Fig. 11. If this movement were all elastic deformation, we would expect point J to return to point G along arrow JG upon relieving the external forces. However, since about 90% of this movement is plastic deformation (after stress decay) point J would only return to point K. Therefore the residual stress at this stage of the operation may be illustrated by vector JK. This stress may be resolved into its horizontal and vertical components JL and LK respectively. Now, by reverse rotation of the core, stress JL is completely eliminated (after stress decay) leaving only stress LK. This stress can be seen to be relatively small compared to the original retraction stress HG. In this manner, the shearing strains in effect obliterate the retraction stresses, so that virtually no subsequent retraction can occur.

As indicated previously, the rest period provided after the initial rotation of the mold core permits substantial stress decay to set in, so that the magnitude of the initial shearing stresses are greatly reduced. However, even after such a rest period there still remains a small amount of rotary shear, namely, vector JL and it is for the purpose of removing this residue that the reverse rotation is imposed. This reverse rotation will therefore be sufficient in magnitude to return the stock to the position which it would take up if permitted to retract of itself along the rotary shear lines. In other words, the reverse rotation actually forces the stock to take up in a short time the position which it would attain at a much slower rate if left to itself, due to what may be termed "sluggish retraction." The rest interval allowed after the reverse rotation before opening the mold permits the stresses to "neutralize" so that the stock is in a state of "set" when the mold is opened. The foregoing considerations of course apply only to raw rubber stocks in the unvulcanized state.

While the invention has been described with specific reference to rotation of a mold core with respect to the outer mold shell, it will of course be understood that the objects of the invention are served equally as well by rotating the outer mold shell while maintaining the core stationary.

It will also be evident that the invention is particularly well adapted to use in connection with tire manufacturing operations wherein the tire tread is preformed from raw rubber stock in annular form by molding, and subsequently united to a tire carcass in the same mold. By eliminating the retraction stresses, the present invention makes it possible to open the preforming mold without having the molded performed separate from the mold while the previously prepared tire carcass is being inserted in the mold.

Having thus described my invention, what I claim and desire to protect by Letters Patent is:

1. A method of shaping rubbery plastic materials having a high elastic memory comprising in combination the steps of compressing the material in a desired shape between two confining members while subjecting the material to heat, moving one confining member with respect to the other to produce shear stresses in the material, maintaining said members in said position for a time sufficient for a substantial stress decay to take place, and moving said confining members with respect to each other in a direction opposite to said first movement partially toward their initial position, whereby any retraction stresses present in the material are substantially obliterated.

2. A method of molding annular articles from rubbery plastic materials having a high elastic memory which comprises compressing the material in an annular mold cavity defined between two confining surfaces in a heated plastic state, rotating one confining surface with respect to the other about the principal axis of the annular cavity, to produce rotary shearing stresses in the material, maintaining said surfaces in the rotated position until the greater part of such stress has decayed, and thereafter reversely rotating said surfaces by an amount sufficient to induce reverse rotary shear of the stresses equal in magnitude to the residual shear stresses remaining from said first rotation, and maintaining said surfaces in said reversed position until said reverse rotary shear substantially decays.

3. A method of molding annular articles from rubbery plastic material having a high elastic memory which comprises subjecting the material to pressure in an annular mold cavity defined between two mold members in a heated plastic state, rotating one mold member with respect to the other about the principal axis of the annular cavity to produce rotary shear stress in the material, maintaining said mold members in the rotated position until a major portion of said stress has decayed, and thereafter rotating said mold members in an opposite sense to the initial rotation for an amount sufficient to return the material substantially to the position to which it would return if permitted to retract freely in a rotary direction, and maintaining said members in said last position until rotary shear stress remaining in the material has substantially decayed.

4. A method of molding annular articles from rubbery plastic material having a high elastic memory which comprises subjecting the material to pressure in an annular mold cavity defined between two mold members in a heated plastic state, rotating one mold member with respect to the other about the principal axis of the annular cavity, the said material having sufficient adherence to the mold members so that said rotation produces rotary shear stress in the material, maintaining said mold members in the rotated position until a major portion of said stress has decayed, and thereafter rotating said mold members in an opposite sense to the initial rotation to produce reverse shear in amount substantially of the same order as the residual rotary shear stress remaining after said stress decay, and maintaining said members in said last position until the material is substantially relaxed within the mold cavity.

5. A method of molding pneumatic tire treads from raw rubber stock comprising in combination the steps of disposing an approximate preform of a tire tread in an annular mold comprised of a shell member and a core member, pressing said shell member and core member together to shape the preform in tire tread form at elevated temperature, rotating the shell member and the core member relative to each other, the tread having sufficient adhesion to the said core and shell so that such rotation produces rotary shearing stresses within the raw tread, subsequently rotating the shell member and the core member in an opposite sense to produce rotary shearing stresses which neutralize the first mentioned rotary shearing stresses, whereby the tendency of the tread to retract when the mold is subsequently opened is substantially reduced.

6. A method of molding pneumatic tire treads from raw rubber stock comprising in combination the steps of disposing an approximate preform of a tire tread in an annular mold comprised of a shell member and a core member, pressing said shell member and core member together to shape the preform in tire tread form at elevated temperature, rotating the shell member and the core member relative to each other, the tread having sufficient adhesion to the said core and shell so that such rotation produces rotary shearing stresses within the raw tread, subsequently rotating the shell and the core relative to each other in an opposite sense from said first rotation to obliterate the first mentioned shearing stresses, and thereafter opening the mold, the surface of said core having less adhesion to the tread than the surface of the shell has to the tread, whereby the tread remains in the position in which it was molded within said shell.

7. A method of making pneumatic tires comprising in combination the steps of molding a preform from raw rubber stock in the form of a transaxial half of a tire tread in an annular mold cavity defined between a core member and a shell member, rotating said core member relative to said shell member, said rubber stock having sufficient adhesion to said core member and said shell member so that said rotation produces rotary shearing strains within the raw rubber stock which substantially obliterate retraction stresses induced in the rubber stock by the molding operation, separating said core member from said shell member, the raw rubber stock having greater adhesion to said shell member than to said core member so that the raw molded tread preform remains within the shell, providing a pneumatic tire carcass, bringing two such raw molded transaxial halves of the tire tread into contact with said tire carcass, uniting said raw tread halves and carcass under the influence of heat and pressure, and curing the resulting assembly in a tire mold.

8. In a method of shaping unvulcanized rubbery materials having a high elastic memory, wherein the material is subjected, without vulcanization, to shaping forces which leave residual stresses in the material that tend to cause retraction after the shaping forces are released, the improvement which comprises the step of subjecting the shaped material, while in the unvulcanized state, to additional stresses in a direction transverse to the said shaping forces and residual stresses, maintaining the material in said additionally stressed state until a major portion of said residual stresses have decayed, and subsequently subjecting the unvulcanized material to stresses opposite to said additional stresses, whereby the effect of the said residual stresses is substantially obliterated and subsequent retraction of the shaped unvulcanized rubbery material is reduced.

9. A method of molding pneumatic tire treads from raw rubber stock comprising shaping the raw rubber stock in an annular mold comprised of a shell member and a core member between which the rubber stock is molded in tire tread form at elevated temperature without curing the tread, rotating the shell member and the core member relative to each other to produce rotary shearing stresses within the raw tread, and thereafter opening the mold after the raw rubber tread has substantially relaxed, whereby the tendency of the raw tread to retract upon said opening of the mold is substantially reduced.

References Cited in the file of this patent

UNITED STATES PATENTS

| Number | Name | Date |
|---|---|---|
| 2,079,584 | Hazell et al. | May 4, 1937 |
| 2,231,769 | Merrill | Feb. 11, 1941 |
| 2,372,177 | Conner | Mar. 27, 1945 |
| 2,476,884 | Maynard | July 19, 1949 |
| 2,497,226 | McNeill | Feb. 14, 1950 |
| 2,549,144 | Truscott | Apr. 17, 1951 |